United States Patent [19]
Longshore

[11] Patent Number: 5,845,199
[45] Date of Patent: Dec. 1, 1998

[54] SIMULCASTING SYSTEM WITH DIVERSITY RECEPTION

[75] Inventor: Theodore F. Longshore, Cary, N.C.

[73] Assignee: Ericsson Inc., Research Triangle Park, N.C.

[21] Appl. No.: 760,493

[22] Filed: Dec. 5, 1996

[51] Int. Cl.[6] .................................................. H04B 17/02
[52] U.S. Cl. .......................................... 455/137; 455/133
[58] Field of Search .................................... 455/500, 503, 455/517, 561, 562, 73, 507, 132, 133, 137

[56] References Cited

U.S. PATENT DOCUMENTS

| | | | |
|---|---|---|---|
| 4,450,585 | 5/1984 | Bell | 455/137 |
| 4,704,734 | 11/1987 | Menich et al. | 455/562 |
| 4,715,048 | 12/1987 | Masamura | 455/137 |
| 4,742,563 | 5/1988 | Fukumura | 455/137 |
| 5,613,234 | 3/1997 | Vella-Coleiro | 455/137 |

*Primary Examiner*—Reinhard J. Eisenzopf
*Assistant Examiner*—Marsha D. Banks-Harold
*Attorney, Agent, or Firm*—Robert A. Samra

[57] ABSTRACT

The present invention provides a system for simulcasting and diversely receiving radio frequency (RF) signals. The system of the present invention comprises at least one RF transceiver and a plurality of RF units each including a transmitter for simulcasting an RF signal to a user and further including one receiver which is paired with another receiver in another one of the RF units, the pair of receivers providing for diversity reception of an RF signal from the user. The implementation of diversity reception with only one instead of two receivers in each RF unit, as taught by the present invention, reduces both signal loss and required cabling in the system.

19 Claims, 4 Drawing Sheets

SIMULCASTING SYSTEM WITH DIVERSITY RECEPTION

BACKGROUND OF THE INVENTION

1. Field of the Invention

The present invention relates to wireless communication systems and, more particularly, to improvements in a simulcasting system which comprises a plurality of remote RF units for simultaneously transmitting a radio frequency (RF) signal to a user of the system and for diversely receiving another RF signal transmitted by the user.

2. Related Prior Art Systems

The architecture for a typical cellular radio system is shown in FIG. 1. A geographical area (e.g., a metropolitan area) is divided into several smaller, contiguous radio coverage areas, called "cells," such as cells C1–C10. The cells C1–C10 are served by a corresponding group of fixed radio stations, called "base stations," B1–B10, each of which includes a plurality of RF channel units (transceivers) that operate on a subset of the RF channels assigned to the system, as well known in the art. For illustration purposes, the base stations B1–B10 are shown in FIG. 1 to be located at the center of the cells C1–C10, respectively, and are shown to be equipped with omni-directional antennas transmitting equally in all directions. However, the base stations B1–B10 may also be located near the periphery or otherwise away from the centers of the cells C1–C10, and may illuminate the cells C1–C10 with radio signals directionally (e.g., a base station may be equipped with three directional antennas each covering a 120 degrees sector).

The RF channels allocated to any given cell (or sector) may be reallocated to a distant cell in accordance with a frequency reuse plan as is well known in the art. In each cell (or sector), at least one RF channel is used to carry control or supervisory messages, and is called the "control" or "paging/access" channel. The other RF channels are used to carry voice conversations, and are called the "voice" or "speech" channels. The cellular telephone users (mobile subscribers) in the cells C1–C10 are provided with portable (hand-held), transportable (hand-carried) or mobile (car-mounted) telephone units, collectively referred to as "mobile stations," such as mobile stations M1–M5, each of which communicates with a nearby base station. Each of the mobile stations M1–M5 includes a controller (microprocessor) and a transceiver, as well known in the art. The transceiver in each mobile station may tune to any of the RF channels specified in the system (whereas each of the transceivers in the base stations B1–B10 usually operates on only one of the different RF channels used in the corresponding cell).

With continuing reference to FIG. 1, the base stations B1–B10 are connected to and controlled by a mobile telephone switching office (MTSO) 20. The MTSO 20, in turn, is connected to a central office (not specifically shown in FIG. 1) in the landline (wireline) public switched telephone network (PSTN) 22, or to a similar facility such as an integrated system digital network (ISDN). The MTSO 20 switches calls between wireline and mobile subscribers, controls signalling to the mobile stations M1–M5, compiles billing statistics, stores subscriber service profiles, and provides for the operation, maintenance and testing of the system. An important function of the MTSO 20 is to perform a "handoff" of a call from one base station to another base station B1–B10 as one of the mobile stations M1–M5 moves between cells. The MTSO 20 monitors the quality of the voice channel in the old cell and the availability of voice channels in the new cell. When the channel quality falls below a predetermined level (e.g, as the user travels away from the old base station towards the perimeter of the old cell), the MTSO 20 selects an available voice channel in the new cell and then orders the old base station to send to the mobile station on the current voice channel in the old cell a handoff message which informs the mobile station to tune to the selected voice channel in the new cell.

The original cellular radio systems, as described generally above, used analog transmission methods, specifically frequency modulation (FM), and duplex (two-way) RF channels in accordance with the Advanced Mobile Phone Service (AMPS) standard. According to the AMPS standard, each control or voice channel between the base station and the mobile station uses a pair of separate frequencies consisting of a forward (downlink) frequency for transmission by the base station (reception by the mobile station) and a reverse (uplink) frequency for transmission by the mobile station (reception by the base station). The AMPS system, therefore, is a single-channel-per-carrier (SCPC) system allowing for only one voice circuit (telephone conversation) per RF channel. Different users are provided access to the same set of RF channels with each user being assigned a different RF channel (pair of frequencies) in a technique known as frequency division multiple access (FDMA). This original AMPS (analog) architecture forms the basis for an industry standard sponsored by the Electronics Industries Association (EIA) and the Telecommunication Industry Association (TIA), and known as EIA/TIA-553.

In the late 1980s, however, the cellular industry in the United States began migrating from analog to digital technology, motivated in large part by the need to address the steady growth in the subscriber population and the increasing demand on system capacity. It was recognized early on that the capacity improvements sought for the next generation cellular systems could be achieved by either "cell splitting" to provide more channels per subscribers in the specific areas where increased capacity is needed, or by the use of more advanced digital radio technology in those areas, or by a combination of both approaches. According to the first approach (cell splitting), by reducing the transmit power of the base station, the size of the corresponding cell (or cell radius) and, with it, the frequency reuse distance are reduced thereby resulting in more channels per geographic area (i.e., increased capacity). Additional benefits of a smaller cell include a longer "talk time" for the user since the mobile station will use substantially lower transmit power than in a larger cell and, consequently, its battery will not need to be recharged as often.

While cell splitting held the promise of improving both capacity and coverage for the growing mobile subscriber base, the actual capacity gains were somewhat limited by the use of the analog AMPS technology. It was commonly believed that the desired capacity gains, and indeed the effectiveness of the microcellular (cell splitting) concept in increasing capacity, can be maximized only by the use of digital technology. Thus, in an effort to go digital, the EIA/TIA developed a number of air interface standards which use digital voice encoding (analog-to-digital conversion and voice compression) and time division multiple access (TDMA) or code division multiple access (CDMA) techniques to multiply the number of voice circuits (conversations) per RF channel (i.e., to increase capacity).

The current digital standards include IS-54 (TDMA) and IS-95 (CDMA), both of which are "dual mode" standards in that they support the use of the original AMPS analog voice and control channels in addition to digital speech channels defined within the existing AMPS framework (so as to ease the transition from analog to digital and to allow the continued use of existing analog mobile stations). The dual-mode IS-54 standard, in particular, has become known as the digital AMPS (D-AMPS) standard. More recently, the EIA/TIA has developed a new specification for D-AMPS, which includes a digital control channel suitable for supporting public or private microcell operation, extended mobile station battery life, and enhanced end-user features. This new specification builds on the IS-54B standard (the current revision of IS-54), and it is known as IS-136. (All of the foregoing EIA/TIA standards are hereby incorporated herein by reference as may be necessary for a full understanding of these background developments. Copies of these standards may be obtained from the Electronics Industries Association, 2001 Pennsylvania Avenue, N.W., Washington, D.C. 20006).

Along with the recent shift to digital technology in cellular systems, there has been an increasing shift towards the use of lightweight pocket telephones by subscribers who desire to receive wireless service not only while driving but also while walking around in their homes or offices or in the public streets or meeting places. This desire is reflected in the emerging concept of "personal communication services" (PCS). The goal of PCS systems is to provide a user moving around, for example, inside an office building, a factory, a warehouse, a shopping mall, a convention center, an airport, or an open area with the ability to transmit and/or receive telephone calls, facsimile, computer data, and paging and text messages. PCS systems operate on lower power and use smaller cellular structures called "microcells" or "picocells" (as compared with the "macrocells" used in conventional wide area (vehicular) cellular systems) so as to provide the high-quality, high-capacity radio coverage needed for private business and other applications. A microcell may cover a public indoor or outdoor area (e.g., a convention center or a busy downtown street). A picocell may cover an office corridor or a floor of a high rise building. Microcells and picocells can also cover high-density pedestrian areas or busy thorough-fares (streets or highways) in a conventional cellular system.

As well known in the art, the use of smaller cells (microcells or picocells) increases the frequency of handoffs and thus system processing load. One known technique for providing high capacity microcellular coverage while also minimizing handoffs is simulcasting in which the signal from the same radio frequency (RF) transceiver (i.e., same RF channel) at a base station is simultaneously transmitted through multiple remote RF units that are spread over a given geographic area, such as one floor of an office building, for example. Handoff is eliminated as a user moves around in such an area since the user will constantly be able to communicate with the base station at sufficient signal strength through the nearest RF unit. Consequently, the entire simulcasting area can be viewed as only one cell. Simulcasting also improves the trunking efficiency of the system since it increases the number of RF channels per area. Furthermore, simulcasting the transmit signal allows the transmit power amplifier in the main transceiver to be replaced with a smaller and cheaper amplifier in each of the remote RF units. The remote RF units themselves can be of relatively low cost since they generally do not require the use of intermediate frequency (IF) filters, demodulators and similar components traditionally used in RF transceivers (e.g., each RF unit may be comprised only of an RF filter, a transmit amplifier, a receive amplifier and/or an RF converter).

FIG. 2 shows a conventional architecture for a simulcasting system including a base station and a plurality of remote RF units. The base station include s a base station controller (BSC) 30 and a plurality of transceivers (TRX 1-TRX n) 32. The BSC 30 coordinates the overall operation of the base station and communicates speech and control signals with the MTSO 20. Each of the n transceivers 32 may be an analog (e.g, FDMA) transceiver or a digital (e.g., TDMA or CDMA) transceiver which processes analog or digital baseband signals, respectively, into RF signals (and vice versa). The transmit RF signals from the n transceivers 32 are combined into a single transmit RF signal in a transmitter combiner 34. The output of the combiner 34, in turn, is provided as an input to a transmitter splitter 36 which separates the input signal into a plurality of output signals for delivery to a corresponding plurality of remote RF units (RF unit 1-RF unit m) 38. The RF units 38 are positioned throughout a given are a (e.g., a building floor) so as to provide the desired radio coverage in this area.

As shown in FIG. 2, each of the RF units 38 is comprised of a transmitter (TX), a first receiver (RXA) and a second receiver (RXB). The transmitter (TX) in each RF unit 38 may include an RF amplifiers for amplifying the corresponding transmit signal from the splitter 36 and/or an RF converter for RXB) in each RF unit 38 are respectively connected to two spatially separated antennas (not shown) which are used to provide diversity reception of signals from the users of the system. As well known in the art, diversity reception can ameliorate the effects of signal fading since the signals arriving at the two spatially separated antennas are not likely to be highly correlated or to have similar fading characteristics.

With continuing reference to FIG. 2, the signals received by the two receivers (RXA and RXB) in each of the m RF units 38 are respectively relayed to a first receiver (RXA) combiner 40 and a second receiver (RXB) combiner 42. Each of the first and second receiver combiners 40 and 42, respectively, combines the m input signals into a single output signal which is provided as an input to a corresponding first receiver (RXA) splitter 44 or a second receiver (RXB) splitter 46, respectively. Each of the splitters 44 and 46, in turn, separates its input signal into n output signals for delivery to the corresponding transceivers 32. In each of the transceivers 32 the signals received from the two diversity branches or paths (RXA and RXB) can be combined using a diversity reception algorithm, as well known in the art.

While the prior art arrangement shown in FIG. 2 provides the desired simulcasting with the advantageous diversity reception, it also suffers from significant shortcomings. First, each of the receivers in the RF units 38 has an additive effect on noise (or signal deterioration). As well known in the art, the signal loss on either diversity branch (RXA or RXB) is 10×log(m), where m is the number of the RF units 38 or, more specifically, the number of corresponding receivers (RXA or RXB). Thus, for example, if m=6, the signal loss on either branch will be 10×log (6)=7.8 dB. Second, in this prior art arrangement at least two and possibly three cables are required to connect each of the remote RF units 38 to the transmitter splitter 36 and the two receive combiners 40 and 42. As can be seen from FIG. 2, each RF unit 38 is connected with three cables 48, 50 and 52 to the transmitter splitter 36 and the receive combiners 40 and 42, respectively. If six RF units 38 are used, for example, a total of 18 cables will be required. Such cabling requirements increase the cost of the overall system. Although it is possible to use a frequency duplexer to combine the transmit signal with one of the two receive signals for any of the RF units 38 and thus, for example, to replace the cables 48 and 50 for that RF unit with a single cable, this solution eliminates only one of three cables and incurs the cost of a duplexer.

In light of these shortcomings of the prior art approach to simulcasting with diversity reception in the microcellular environment, there is a need for a new approach which can reduce both signal noise and the cost of cabling associated with the use of multiple remote RF units for simulcasting while still providing for effective diversity reception within this environment.

SUMMARY OF THE INVENTION

In general terms, the present invention contemplates the use of only one receiver (instead of two receivers) in each of the remote RF units and using a pair of these receivers from two neighboring RF units to provide the desired diversity branches (RXA and RXB). In this manner, diversity reception can be implemented in a simulcast system while also reducing the number of receivers in the remote RF units and, hence, reducing the signal loss on each diversity branch as well as the total amount of cabling required in the system.

In one aspect, the present invention provides a system for simulcasting at least one radio frequency (RF) signal to at least one user and for diversely receiving at least one other RF signal from the at least one user. The system comprises at least one RF transceiver for transmitting the at least one RF signal to the at least one user and for receiving the at least one other RF signal from the at least one user; a plurality of RF units each including a transmitter for simulcasting the at least one RF signal to the at least one user and further including one receiver which is paired with another receiver in another one of the RF units such that each pair of receivers provides for diversity reception of the at least one other RF signal from the at least one user; and means for connecting the at least one transceiver to the RF units. In this system, the at least one RF transceiver may comprise an analog transceiver or a digital transceiver. Furthermore, the digital transceiver may use time division multiple access (TDMA) or code division multiple access (CDMA). Each RF unit may comprise an RF filter, a transmit amplifier, a receive amplifier and/or an RF converter. The two RF units corresponding to any pair of receivers may be separated from each other by a distance which is not greater than would allow the at least one other RF signal from the at least one user to be simultaneously received by the pair of receivers.

According to this first aspect of the system of the present invention, the at least one RF transceiver may comprise a plurality of RF transceivers for transmitting a plurality of RF signals to a plurality of users and for receiving a plurality of RF signals from the users, and the connecting means may comprise a transmitter combiner for combining the outputs of the transceivers into a combined transmit RF signal; a transmitter splitter for splitting the combined transmit RF signal into a plurality of transmit signals for simultaneous transmission by the RF units; a first receiver combiner for combining the outputs of first ones of the receivers in the pairs of receivers into a first combined received RF signal; a second receiver combiner for combining the outputs of second ones of the receivers in the pairs of receivers into a second combined received RF signal; a first receiver splitter for splitting the first combined received RF signal into a plurality of first received signals for respective delivery to the RF transceivers; and a second receiver splitter for splitting the second combined received RF signal into a plurality of second received signals for respective delivery to the RF transceivers. In one embodiment of this system, each of the RF units is connected to the transmitter splitter with one cable and is further connected to either the first receiver combiner or the second receiver combiner with another cable. In another embodiment of this system, each of the RF units is connected both to the transmitter splitter and to either the first receiver combiner or the second receiver combiner with one cable.

In another aspect, the present invention provides a method for simulcasting at least one radio frequency (RF) signal to at least one user and for diversely receiving at least one other RF signal from the at least one user. The method comprises the steps of providing at least one RF transceiver for transmitting the at least one RF signal to the at least one user and for receiving the at least one other RF signal from the at least one user; providing a plurality of RF units each including a transmitter for simulcasting the at least one RF signal to the at least one user and further including one receiver which is paired with another receiver in another one of the RF units such that each pair of receivers provides for diversity reception of the at least one other RF signal from the at least one user; and interconnecting the at least one transceiver to the RF units. In this method, the at least one RF transceiver may comprise an analog transceiver or a digital transceiver. Furthermore, the digital transceiver may use time division multiple access (TDMA) or code division multiple access (CDMA). Each RF unit may comprise an amplifier and/or an RF converter. The two RF units corresponding to any pair of receivers may be separated from each other by a distance which is not greater than would allow the at least one other RF signal from the at least one user to be simultaneously received by the pair of receivers.

These and other aspects, objects and advantages of the present invention will become readily apparent from the accompanying drawings and the detailed description of the invention as set forth below.

BRIEF DESCRIPTION OF THE DRAWINGS

The present invention will be better understood and its numerous objects and advantages will become apparent to those skilled in the art by reference to the following drawings in which.

DETAILED DESCRIPTION

Figure 1:
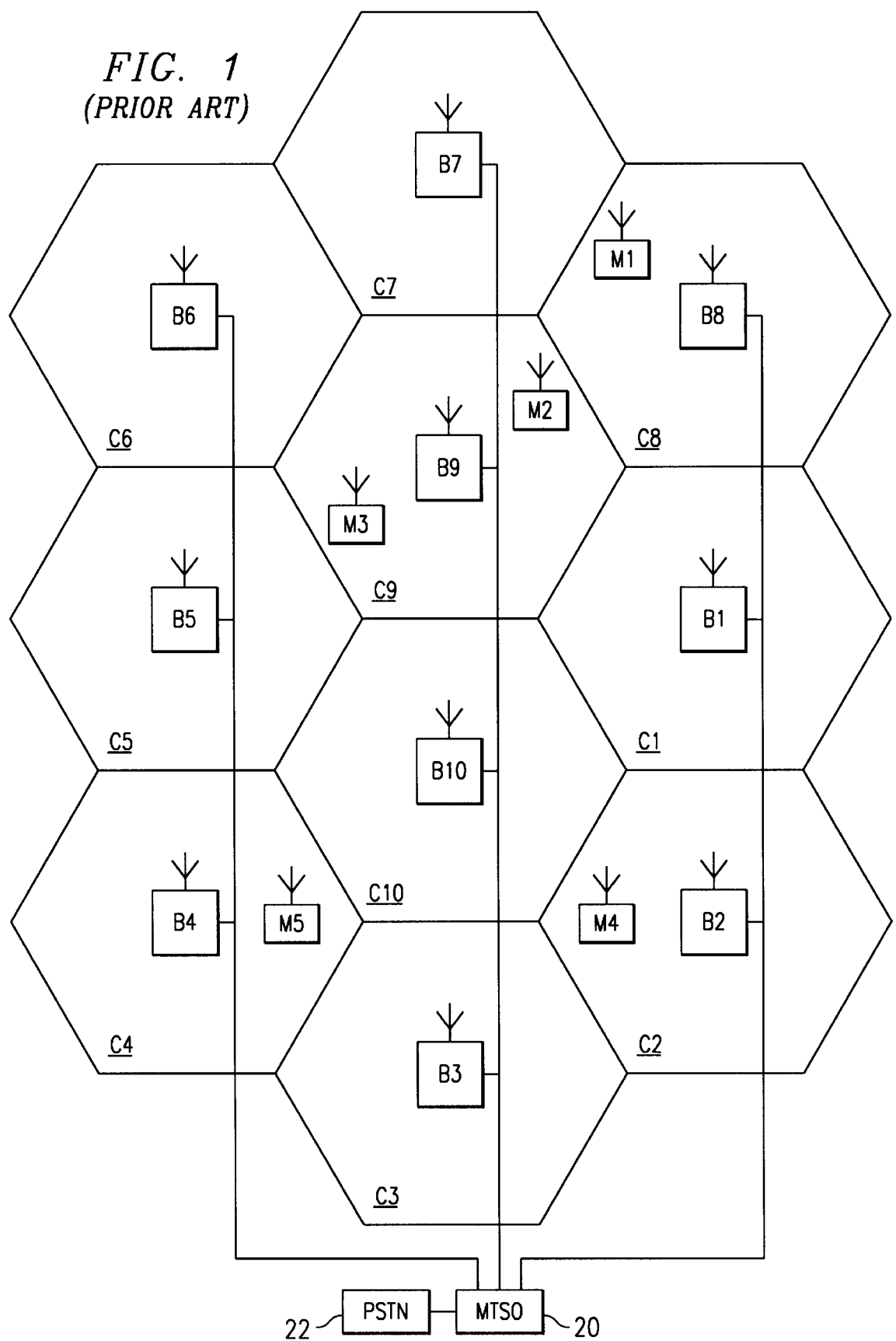
FIG. 1 shows the architecture of a conventional cellular radio system including a plurality of mobile stations and base stations communicating over a plurality of radio frequency (RF) channels.
Figure 2:
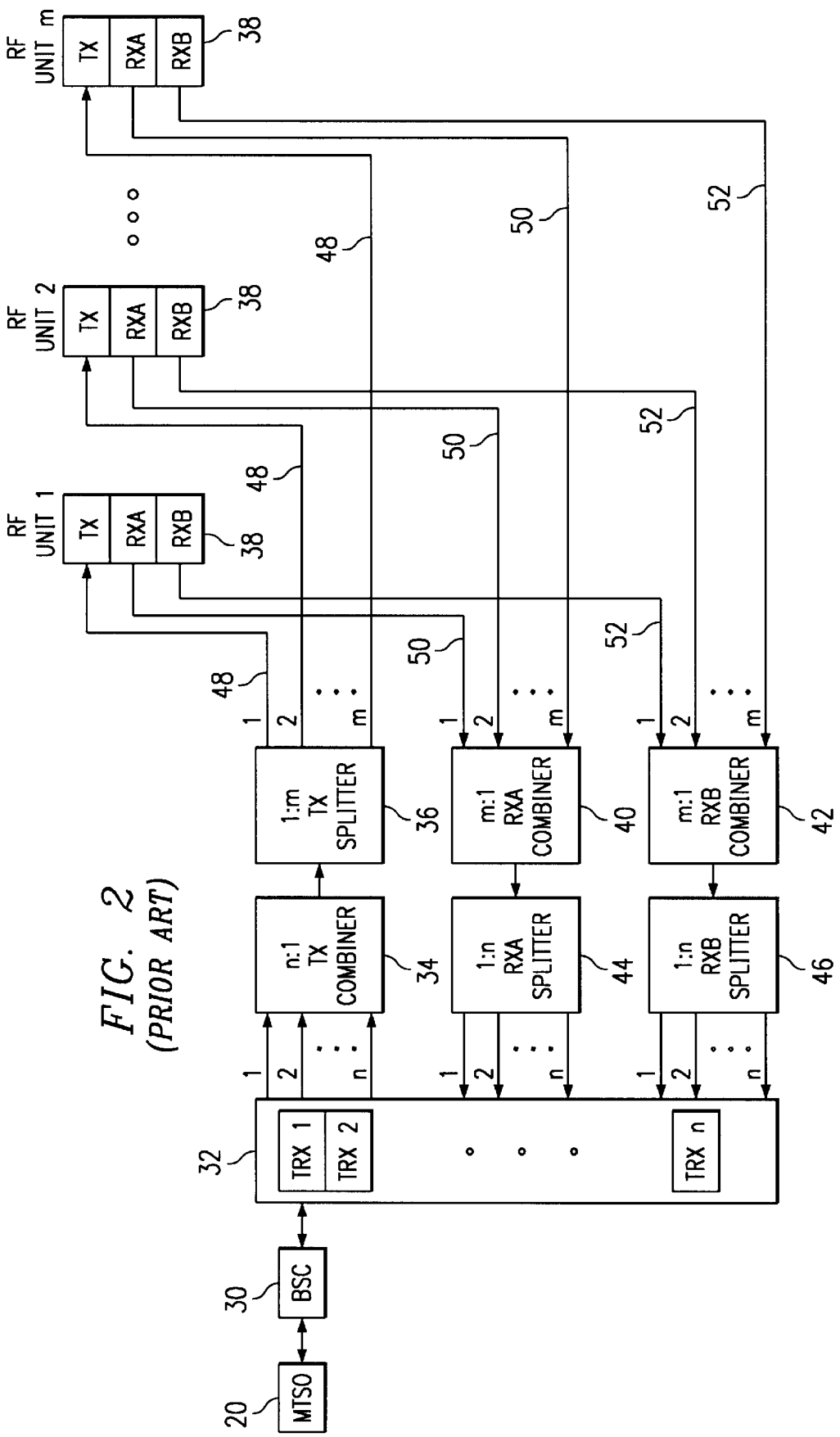
FIG. 2 shows a block diagram of a conventional simulcasting system including a base station connected to a plurality of remote RF units which also provide for diversity reception.
Figure 3:
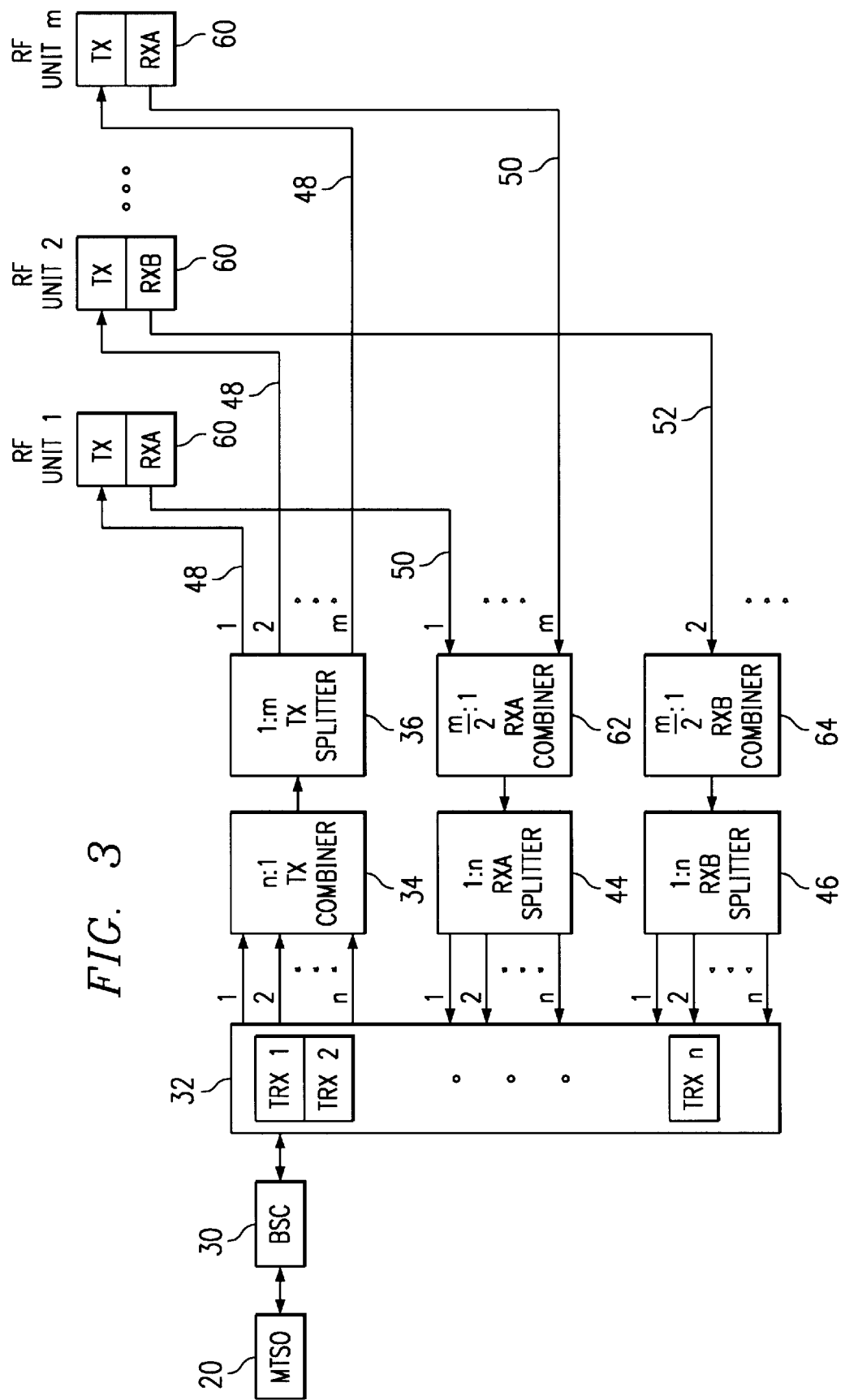
FIG. 3 shows a block diagram of an improved simulcasting and diversity reception system constructed in accordance with the present invention.
Figure 4:
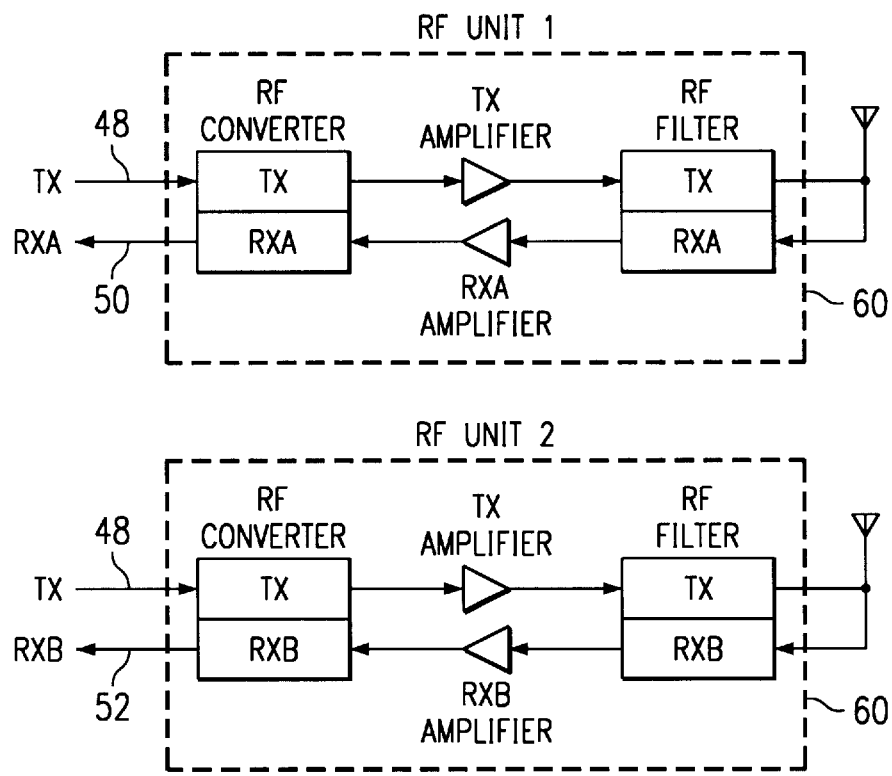
FIG. 4 is an exemplary construction of a pair of RF units shown in FIG. 3.

Referring now to FIG. 3–4, there is shown an exemplary construction of the simulcasting and diversity reception system of the present invention. As compared with the prior art system in FIG. 2, the system of the present invention can provide simulcasting and diversity reception using a plurality of RF units 60 each of which includes only one receiver (RXA or RXB). To provide diversity reception (in addition to primary reception), the receiver in each RF unit 60 may be paired with the receiver in another nearby RF unit 60. Thus, for example, the receiver in RF unit 1 (RXA) may be paired with the receiver in RF unit 2 (RXB). Each pair (RXA and RXB) of RF units 60 may be spaced from each other at a distance which is greater than usually required for diversity reception in any of the RF units 38 (FIG. 2), but which nevertheless allows for at least some overlap of radio coverage between the two RF units 60. Within these general guidelines, however, the exact positioning of each pair of RF units 60 should not be critical in practice since the user is not likely to be far from either receiver (RXA or RXB) at any time and, further, the multiple reflections of the RF signal within a building environment, for example, serve to ensure that a minimum signal will be received by each of the two diversity receivers.

The present invention as illustrated in FIG. 3 reduces both signal losses and cabling requirements in a simulcast system. It will be readily appreciated that diversity reception in FIG. 3 may be achieved with half of the number of receivers required in FIG. 2. Thus, the signal loss is significantly lower for the inventive system in FIG. 3 as compared with the prior art system of FIG. 2. For example, if six RF units 60 are used (i.e., m=6), the signal loss on either diversity branch (RXA or RXB) in FIG. 3 will be 10×log(3)=4.8 dB, instead of 10×log(6)=7.8 dB as was the case for FIG. 2. Further, it will be seen from FIG. 3 that since each RF unit 60 has only one receiver (RXA or RXB) and therefore is connected to one but not both of receive combiners 62 and 64, no more than two cables (i.e., the transmit cable 48 and one of the receive cables 50 and 52), instead of all three cables as was the case for the RF units 38 in FIG. 2, are required to connect any RF unit 60 to the transceivers 32 (through the 1:m transmit splitter 36 and the m/2:1 receive combiner 62 or 64). If six RF units 60 are used, for example, only 12 cables (instead of 18 cables for six RF units 38 in FIG. 2) would be required. The number of required cables can be reduced even further if a duplexer is used to combine the transmit and received RF signals for any RF unit 60 so that only one transmit/receive cable would be required for interconnecting that RF unit to the transceivers 32.

It will be appreciated that many modifications and variations may be made to the foregoing embodiments of the present invention and, further, that many alternative embodiments may be constructed by persons of ordinary skill in the art without substantially departing from the spirit and scope of the teachings of the present invention as disclosed herein. Thus, it will be appreciated that the forms of the invention disclosed herein are exemplary and are not intended as a limitation on the scope of the present invention as defined in the following claims.

I claim:

1. A system for simulcasting at least one radio frequency (RF) signal to at least one user and for diversely receiving at least one other RF signal from said at least one user, the system comprising:

at least one RF transceiver for transmitting said at least one RF signal to said at least one user and for receiving said at least one other RF signal from said at least one user;

a plurality of RF units each including a transmitter for simulcasting said at least one RF signal to said at least one user and further including one receiver which is paired with another receiver in another one of said RF units such that each pair of receivers provides for diversity reception of said at least one other RF signal from said at least one user; and means for connecting said at least one RF transceiver to said RF units.

2. The system of claim 1 wherein said at least one RF transceiver comprises an analog transceiver.

3. The system of claim 1 wherein said at least one RF transceiver comprises a digital transceiver.

4. The system of claim 3 wherein said digital transceiver uses time division multiple access (TDMA).

5. The system of claim 3 wherein said digital transceiver uses code division multiple access (CDMA).

6. The system of claim 1 wherein each of said RF units comprises a transmit and/or a receive amplifier.

7. The system of claim 6 wherein each of said RF units further comprises an RF converter.

8. The system of claim 1 wherein the two RF units corresponding to any pair of receivers are separated from each other by a distance which is not greater than would allow said at least one other RF signal from said at least one user to be simultaneously received by said pair of receivers.

9. The system of claim 1 wherein said at least one RF transceiver comprises a plurality of RF transceivers for transmitting a plurality of RF signals to a plurality of users and for receiving a plurality of RF signals from said users, and wherein said connecting means comprises:

a transmitter combiner for combining the outputs of said transceivers into a combined transmit RF signal;

a transmitter splitter for splitting the combined transmit RF signal into a plurality of transmit signals for simultaneous transmission by said RF units;

a first receiver combiner for combining the outputs of first ones of the receivers in said pairs of receivers into a first combined received RF signal;

a second receiver combiner for combining the outputs of second ones of the receivers in said pairs of receivers into a second combined received RF signal;

a first receiver splitter for splitting the first combined received RF signal into a plurality of first received signals for respective delivery to said RF transceivers; and a second receiver splitter for splitting the second combined received RF signal into a plurality of second received signals for respective delivery to said RF transceivers.

10. The system of claim 9 wherein each of said RF units is connected to said transmitter splitter with one cable and is further connected to either said first receiver combiner or said second receiver combiner with another cable.

11. The system of claim 9 wherein each of said RF units is connected both to said transmitter splitter and to either said first receiver combiner or said second receiver combiner with one cable.

12. A method for simulcasting at least one radio frequency (RF) signal to at least one user and for diversely receiving at least one other RF signal from said at least one user, the method comprising the steps of:

providing at least one RF transceiver for transmitting said at least one RF signal to said at least one user and for receiving said at least one other RF signal from said at least one user;

providing a plurality of RF units each including a transmitter for simulcasting said at least one RF signal to said at least one user and further including one receiver which is paired with another receiver in another one of said RF units such that each pair of receivers provides for diversity reception of said at least one other RF signal from said at least one user; and interconnecting said at least one transceiver to said RF units.

13. The method of claim 12 wherein said at least one RF transceiver comprises an analog transceiver.

14. The method of claim 12 wherein said at least one RF transceiver comprises a digital transceiver.

15. The method of claim 14 wherein said digital transceiver uses time division multiple access (TDMA).

16. The method of claim 14 wherein said digital transceiver uses code division multiple access (CDMA).

17. The method of claim 12 wherein each of said RF units comprises a transmit and/or a receive amplifier.

18. The method of claim 17 wherein each of said RF units further comprises an RF converter.

19. The method of claim 12 wherein the two RF units corresponding to any pair of receivers are separated from each other by a distance which is not greater than would allow said at least one other RF signal from said at least one user to be simultaneously received by said pair of receivers.

* * * * *